Sept. 15, 1970 D. A. WASMER 3,528,301
DUST SEAL FOR BRAKE PISTON
Filed July 1, 1968
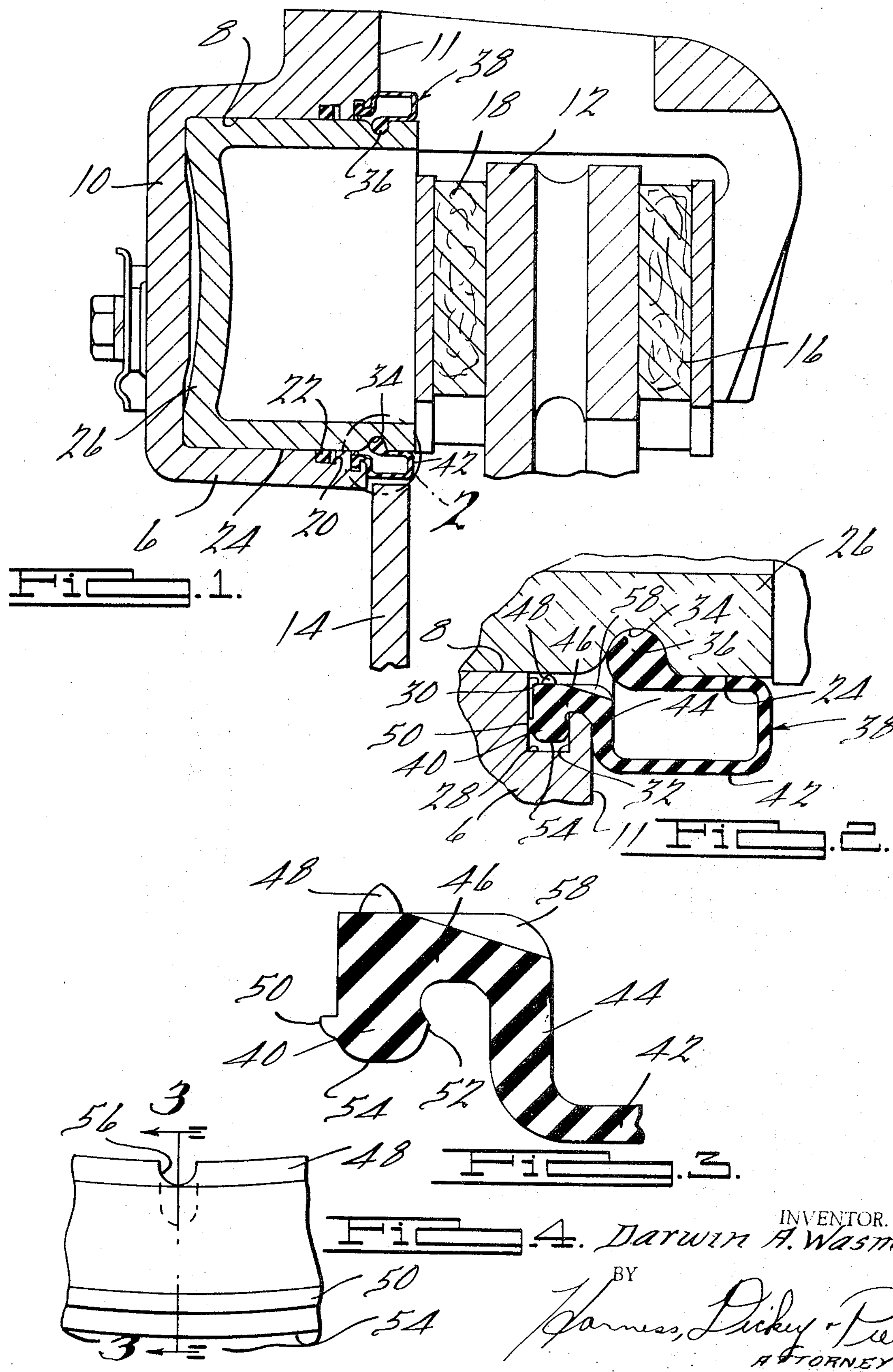
INVENTOR.
Darwin A. Wasmer
BY
Harness, Dickey & Pierce
ATTORNEYS.

3,528,301

DUST SEAL FOR BRAKE PISTON

Darwin A. Wasmer, Detroit, Mich., assignor to Kelsey-Hayes Company, Romulus, Mich., a corporation of Delaware Filed July 1, 1968, Ser. No. 741,734
Int. Cl. F16j *15/16*
U.S. Cl. 74—18.2 3 Claims

ABSTRACT OF THE DISCLOSURE

A disk brake incorporating a novel dust seal construction. The dust seal is provided with annular beads at its opposite ends, one bead being fitted in an annular groove on the piston and the other bead being fitted in an annular groove formed at one end of the cylinder bore. This latter bead is compressed between opposite radial walls of the cylinder bore groove and has a lip which is slidably engaged by the piston to hold this bead in its groove.

BACKGROUND OF THE INVENTION

Disk brakes have heretofore employed a variety of different dust seal constructions to prevent the entrance of dirt, dust, water and other contaminating material to the space between the outer periphery of the piston and the wall of the cylinder bore. Some of such seals have been fitted to the housing at a flat face thereof in an area surrounding one end of the cylinder bore. Other dust seals have been fitted within a groove of the cylinder bore itself but the construction has attempted to provide a seal at the bottom wall of the cylinder bore. In such cases it has been found that dirt and other contaminant frequently work under the seal and into the critical working areas of the piston. Various dust seals have also been fitted in counterbores formed in the piston bore, an arrangement which has necessitated the use of separate retaining rings or the like to keep the dust seal in place within this counterbore.

SUMMARY OF THE INVENTION

The dust seal of the present invention has a bead which is fitted in an annular groove of the cylinder bore and held therein by the engagement of a projection or rib on the dust seal with the piston. Further, this bead has a relative compressible lip on one side thereof which functions as a spring to hold the opposite side of the bead in sealing contact with a radial wall of the groove.

It is an object of the present invention to overcome the various disadvantages of prior disk brake dust seals by the foregoing features which eliminate any separate retaining means for the dust seal, provide a positive seal for the exclusion of undesirable contaminating matter from the area between the piston and the cylinder bore, and provide a dust seal construction which is relatively easily assembled.

It is still another object of the present invention to provide a disk brake construction incorporating a novel dust seal which is inexpensive to manufacture, durable in construction, reliable in operation and possessed of a high degree of structural simplicity.

DESCRIPTION OF THE PREFERRED EMBODIMENT AND DRAWINGS

FIG. 1 is a sectional view of a disk brake embodying the present invention;

FIG. 2 is an enlarged view of that portion of FIG. 1 enclosed within the circle 2;

FIG. 3 is an enlarged fragmentary sectional view of the dust seal of FIG. 1, removed from its associated structure, the section being taken along the line 3—3 of FIG. 4, and FIG. 4 is a fragmentary end view of the structure illustrated in FIG. 3.

Referring now to FIG. 1, there is illustrated a housing 6 provided with an axially extending cylinder bore 8 which is closed by a wall 10 at one end thereof and is open at its opposite end to a housing end wall 11 adjacent a rotor or disk 12. The housing 6 may consist of a conventional caliper housing which may be supported by a variety of well known means on a fixed support member 14. The housing 6 has a fixed shoe 16 secured to one side thereof, while a sliding shoe 18 is positioned between the cylinder bore 8 and the rotor 12 and is preferably supported on the support member 14. The cylinder bore 8 has a first annular groove 20 which receives an annular elastomeric primary seal 22. The seal 22 seals against brake fluid leakage by engagement with the outer periphery 24 of a piston 26. The piston 26 slides within the cylinder bore 8 and projects from the cylinder bore to abut the shoe 18.

A second annular groove 28 is formed in the wall of the cylinder bore 8 adjacent the open end thereof. The groove 28 has a pair of opposite radially extending walls 30 and 32. Both of the radial walls 30 and 32 are an annular configuration and possess identical outer diameters. The wall 32, however, has a larger inner diameter than the wall 30, which has an inner diameter equal to the diameter of the bore 8.

The outer diameter 24 of the piston 26 has an annular groove 34 formed therein a short distance from the end of the piston which engages the shoe 18. The groove 34 serves to receive an annular bead 36 of a dust seal 38. The dust seal 38 is made from molded elastomeric material such as neoprene and, in addition to the bead 36, has a bead 40 and a generally thin walled flexible sleeve portion 42 extending between the beads 36 and 40. The bead 40 is connected to the sleeve portion 42 through a radially extending flange portion 44 and an axially extending cylindrical portion 46. The bead 40 projects radially outwardly from the portion 46 while an annular projection or rib 48 projects radially inwardly from the portion 46.

The bead 40 is distinguished by the provision of a rather than annular lip 50 formed on one side thereof and a continuous annular sealing projection 52 formed on its opposite side. An end wall 54 of the bead 40 lies between the lip 50 and sealing projection 52 and, when the bead 40 is assembled in the groove 28, the end wall 54 lies in spaced relation to the bottom of the groove 28.

The annular rib 48 has an inner peripheral diameter equal to the diameter of the outer periphery 24 of the piston 26. Accordingly, the projection 48 will just make contact with the outer periphery 24 of the piston 26 and permit the piston 26 to slide freely within the projection. However, the engagement of the piston 26 with the projection 48 prevents the bead 40 from coming out of the groove 28. When the bead 40 is positioned within the groove 28, the lip 50 will be compressed in a radial direction to force the sealing projection 52 against the side wall 32 of the groove 28. The axial dimension of the bead 40 between the extremities of the lip 50 and sealing projection 52 in the free state of the bead is greater than the axial length of the groove 28, while the diameter of the groove 28 is greater than the diameter of the bead end wall 54. Accordingly, the positioning of the bead 40 within the groove 28 applies a compressive axial loading to the bead 40 and does not apply any radial compression to the bead.

The bead 40 seals against the entrance of dirt, water and other contaminants by the engagement of its sealing projection 52 with the wall 32, while the lip 50 functions as a spring and is rather highly compressed to hold the sealing projection 52 in a sealing position. It will be noted that the spacig between the flange portion 44 and the sealing projection 52 is substantially equal to the spacing between the wall 32 of the groove 28 and the end wall 11 of the housing 6. Accordingly, the flange portion 44 of the dust seal 38 will lie along the wall 11, and the outer diameter of the portion 46 (not including the projection 48) will lie radially utwardly of the piston outer periphery 24.

It should be noted that the annular projection 48 is provided with a plurality of spaced vent openings 56 and that the portion 46 is relieved in a plurality of similar locations 58. This is done to prevent the formation of a seal between the projection 48 and the piston 26 and to vent the space between the seal 22 and the bead 40. If such venting were not provided, the movement of the piston would attempt to pump air and distort the bead 40.

The use of the piston 26 to maintain the bead 40 within the groove 28 is highly effective and eliminates the need to use separate retaining rings or the like. It has also been found that this construction with its solely radial compression of the bead 40 within the groove 28 provides a highly effective seal which overcomes many of the leakage problems encountered with prior seals.

The assembly of the seal 38 is very easily accomplished. The bead 40 is first positioned in the groove 28. Next, the piston is inserted within the seal 38 until the bead 36 snaps into the groove 34. As the inner end of the piston moves past the projection 48, contact between the piston 26 and the projection 48 will tend to move the adjacent area of the bead 40 radially outwardly and prevent inward displacement of the bead.

While the preferred form of the invention illustrated herein is well calculated to fulfill the objects above stated, it will be apparent that the invention is susceptible of modification, variation and change.

What is claimed is:

1. In a disk brake, a housing having an axially extending cylinder bore provided with an annular radially inwardly facing groove at one end thereof, a piston slidably supported in said cylinder bore and projecting from one end thereof, said projecting end of said piston being adapted to operate a brake pad, and a generally sleeve shaped flexible dust seal interposed between said housing and said piston for precluding the ingress of dust, said dust seal having a first end portion sealingly engaged with said piston around the periphery of said piston, said seal having a bead at the other end thereof received within and sealingly engaged with said inwardly facing groove of said housing, projection means formed on said other end of said seal contiguous to said bead and to said piston for precluding disengagement of said bead from within said inwardly facing groove, and means for defining a continually open air flow path from one side of said projection means to the other providing for substantially free flow of air across said projection means for precluding the exertion of pumping forces upon said bead as said piston moves in said bore.

2. In a disk brake as set forth in claim 1 wherein the means for providing air flow comprises circumferential discontinuities in said projection means.

3. In a disk brake as set forth in claim 1 wherein the sealing engagement between the bead and the inwardly facing groove is provided by a continuous annular sealing projection formed on one side of said bead and axially engaging one side of said groove and a lip formed on the other side of said bead and engaging other side of said groove for exerting an axial compressive force upon said bead.

References Cited

UNITED STATES PATENTS

| | | | |
|---|---|---|---|
| 3,273,675 | 9/1966 | Brown | 188—73 |
| 3,189,360 | 6/1965 | Haberkorn | 277—209 X |
| 3,195,360 | 7/1965 | Burnett | 74—18.2 |
| 3,402,790 | 9/1968 | Rath. | |

FOREIGN PATENTS

| | | |
|---|---|---|
| 1,223,633 | 8/1966 | Germany. |
| 1,323,614 | 3/1963 | France. |

GEORGE E. A. HALVOSA, Primary Examiner

U.S. Cl. X.R.

92—168; 188—100, 152; 277—212